Sept. 30, 1941.  H. BRANSON  2,257,562
INTELLIGENCE TRANSMISSION SYSTEM
Filed March 8, 1937   5 Sheets—Sheet 1

INVENTOR
HARRY BRANSON
BY H. S. Square
ATTORNEY

Sept. 30, 1941.   H. BRANSON   2,257,562
INTELLIGENCE TRANSMISSION SYSTEM
Filed March 8, 1937    5 Sheets—Sheet 2

INVENTOR
HARRY BRANSON
BY
ATTORNEY

Sept. 30, 1941.  H. BRANSON  2,257,562
INTELLIGENCE TRANSMISSION SYSTEM
Filed March 8, 1937   5 Sheets-Sheet 3

INVENTOR
HARRY BRANSON
BY
ATTORNEY

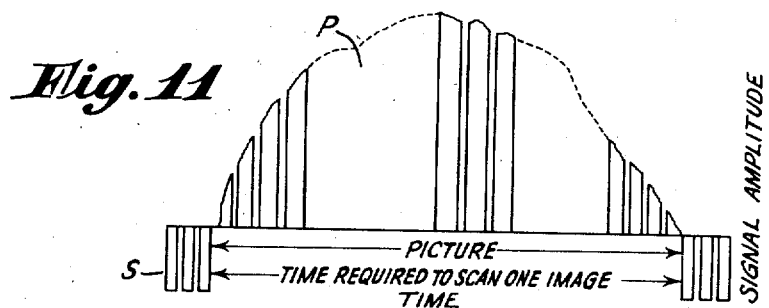
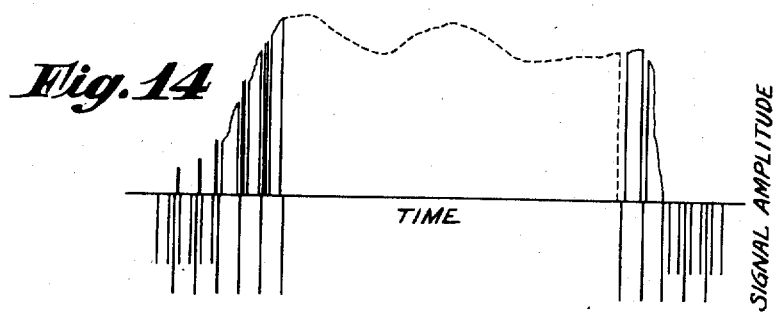
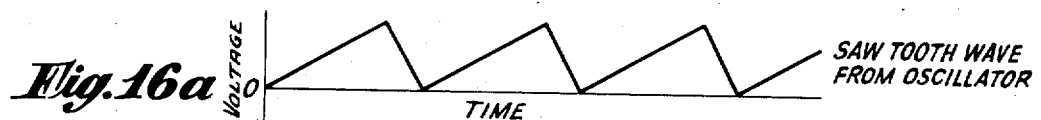
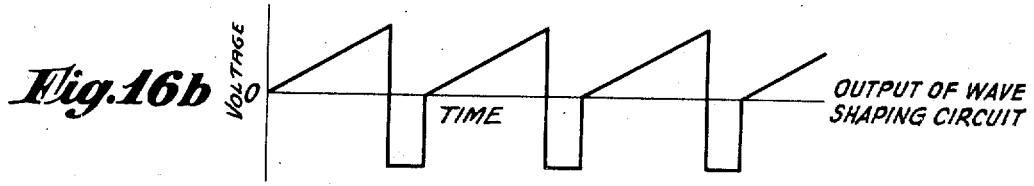
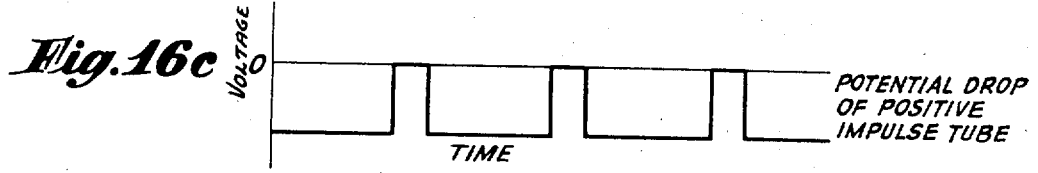
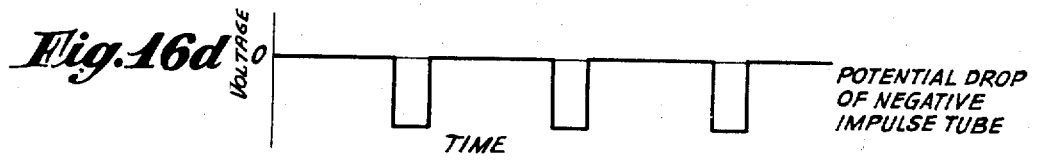

Sept. 30, 1941.　　　　H. BRANSON　　　　2,257,562
INTELLIGENCE TRANSMISSION SYSTEM
Filed March 8, 1937　　　5 Sheets-Sheet 5
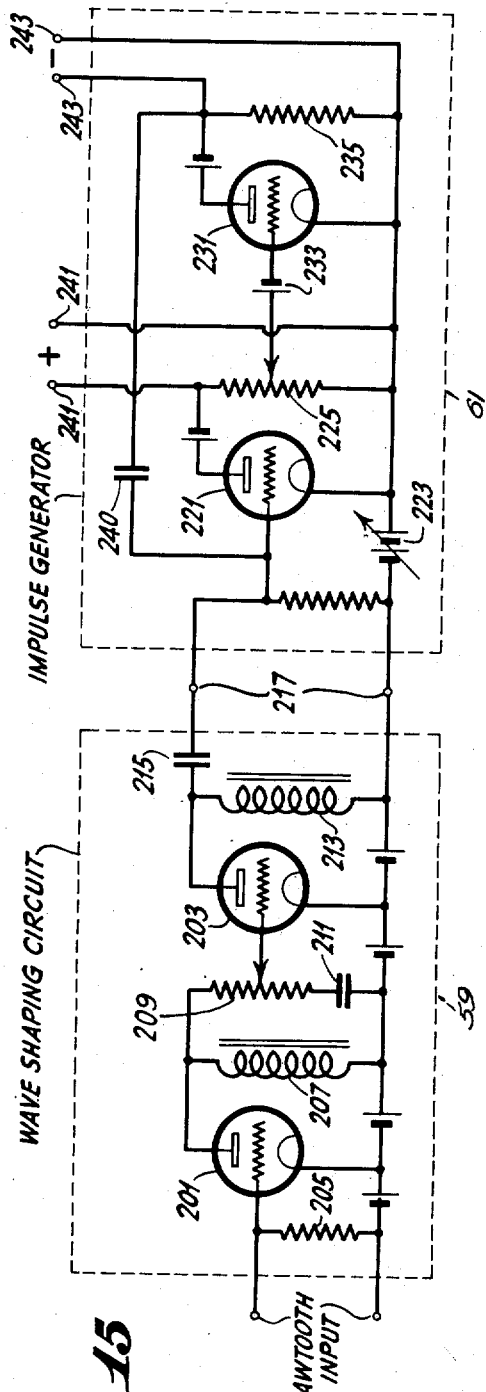
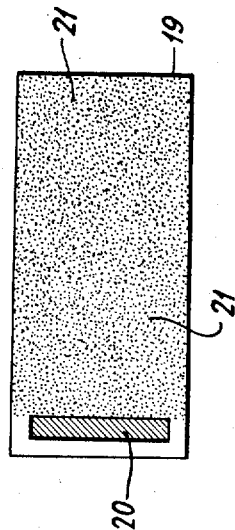
INVENTOR
HARRY BRANSON
BY
ATTORNEY Patented Sept. 30, 1941

2,257,562

UNITED STATES PATENT OFFICE 2,257,562

INTELLIGENCE TRANSMISSION SYSTEM

Harry Branson, Philadelphia, Pa., assignor to Radio Corporation of America, a corporation of Delaware Application March 8, 1937, Serial No. 129,568

8 Claims. (Cl. 178—5.6)

This invention is a continuation in part of my copending application Serial No. 665,064, filed April 8, 1933, and entitled "Intelligence transmission systems."

The present invention relates to systems for transmitting intelligence from one point to another by radio, wire or wired radio communication systems. In a selected form the invention is particularly directed to television systems wherein the visual action to be portrayed is transmitted with accompanying sound indications. Such sound may occur with and be coordinated with the visual representation at the transmission point, or may be in the nature of an accompaniment thereto.

In sound motion picture work the film record usually comprises a series of pictorial representations intermittently produced. These representations are formed on the film adjacent to a sound track which is in the form of a continuous sound record. The sound indications are formed as various types of records such, for example, as the variable density or the variable width type, or the sound action may appear on a separate and independent record, such as a disk, from which it is mechanically or electrically reproduced when accurately coordinated in time relationship with the film in reproduction.

The interest in television transmission is increased to a considerable degree where the observer of the reconstructed image of the subject or object at the point of transmission is accompanied by sound signals so as to make the action more realistic and it, therefore, is with a view to producing a television and sound transmission and reception system of this general nature that the present invention is developed.

It has already been proposed, as disclosed by Vladimir K. Zworykin in application Serial No. 665,098, filed April 8, 1933, this being now issued in Great Britain as British Patent No. 434,890, and assigned to Radio Corporation of America, to provide a system for combined image and sound transmission upon a single carrier frequency. In the Zworykin system the sound signals are stored, or converted into electrical charges or an electrical sound image or non-pictorial record. As the sound signals are being converted into an electrical sound record image signals are transmitted for a time period corresponding to the scanning period of a single picture line or elemental strip. Immediately following this scanning period the stored sound signal is transmitted, but in reverse order in time to that of its occurrence. At the receiver end of the system the picture and sound signals are received and an elemental strip of an electro-optical image is suitably produced from picture signals and an electrical record, that is, a series of stored charges, is produced from the sound signals. The electrical sound record is produced at the receiver in the same time order as its transmission, or, in other words, is reversed from that of its production at the transmission point. This sound signal will later be reproduced in the order of its original occurrence at the time when the following line or elemental strip of the electro-optical image is produced.

To summarize, now, the operation of such a system it can be assumed that 24 pictures or complete images are transmitted per second and that each picture is scanned along 180 independent elemental strips. So arranged the scanning period, that is, a complete cycle, for any one elemental strip, is $\frac{1}{4320}$ seconds. During the $\frac{1}{4320}$ second period $\frac{9}{10}$ of the time (called herein period "A") will be used to produce the picture signals and to store the sound signals. During the remaining $\frac{1}{10}$ of the $\frac{1}{4320}$ of a second (called herein period "B") the production of picture signals and the electrical storage of sound signals are interrupted and the sound signals are transmitted in reversed order. Period B is followed now by a second picture transmission and sound storage period A' and another period B' during which the transmission is a repetition of period B. This repetition occurs again and again until the transmission ceases.

While this is happening at the transmission point in the receiver the picture signals are reproduced during period A; during period B the picture reproduction is interrupted and sound signals are stored; during period A' picture signals are again produced and simultaneously the sound signals stored during period A' are reproduced; and during period B' there is a repetition of the action during period B. It is thus seen that such a system can produce coordinated sound and picture signals over a single transmission channel and that the only delay in the sound reproduction is a $\frac{1}{4320}$ second period which, of course, cannot be detected by the human ear.

The present invention, while it attempts to improve upon a system of this general type and has, therefore, as its principal aim and object, in common with the above mentioned Zworykin apparatus, that of transmitting both the television and the sound signals upon the same carrier frequency so as to avoid the necessity of generating independent carrier frequencies for each type of transmission and thereby providing a different modulator for modulating the generated carriers independently by the television and the sound signals, seeks also to improve the transmission through the use of new and novel means for storing and transmitting the signals.

In television transmission the frequency band required to transmit a satisfactory image representation is a function of the number of complete image transmission, that is, the scanning frequency, and the number of image points into which each image is assumed to be divided for the purpose of transmission. In transmitting 24 complete image representations per second divided as above assumed and wherein each elemental strip is assumed to be composed of approximately 180 individual elemental areas, it can be seen that the complete frequency band required for transmission is of the order of 1 megacycle.

When recourse is had to the cathode ray tube as a transmitting and/or receiving instrumentality it is customary to use the cathode ray generated with the tube to scan an object or to reproduce an image of the scanned object for approximately $\frac{11}{12}$ of the time available. This practice originates because of the fact that the cathode ray to scan or to reproduce a picture traverses either a photo sensitive surface within the scanning tube or the fluorescent screen of the receiving tube at a relatively slow speed in one direction but at a rapid speed in the reverse direction so that the scanning or analyzing operation appears to occur always in one direction. The $\frac{1}{12}$ of the time that is lost from scanning or reproduction occurs during a reversal of the cathode ray beam to a position of starting.

This reversal of the cathode ray has commonly been termed the "return line period". In this period it is customary to transmit a synchronizing signal by which the oscillators at both the transmitter and receiver may be locked in step so as to cause the cathode ray beams at both the transmitter and the receiver to operate synchronously. However, where the frequency band required approaches 1 megacycle it is seen that there is, in fact, a loss of nearly 100,000 cycles of intelligence transmission occasioned by the reversal of the cathode ray beam. This full loss cannot be compensated by the inclusion of the synchronizing signal, above referred to, within this period since the synchronizing signal usually requires only substantially ½ of the reversal or return line period for its transmission. Hence, it is in this time period, which heretofore has been lost so far as its utilization is concerned, that it is proposed to transmit the sound signals which accompany the picture action for each assumed elemental strip which is reconstructed by the cathode ray at the receiver into an electro-optical image during its slow transversal from one edge portion of the tube fluorescent viewing screen to the opposite edge portion.

It is an object of the present invention to provide improved ways and means by which sound and television signals may be transmitted upon a single carrier frequency without causing any interfering action one with the other.

It is a further object of the present invention to provide an improved system for transmitting sound signals related to television image signals in which the sound signals occurring within a relatively long time period may be transmitted within a relatively short time period and then caused to become audible at the points of reception during time periods corresponding in duration to those during which the sound signals were originally formed.

It is a further object of this invention to provide ways and means for condensing the sound occurring within the time required to scan a single elemental strip of a subject of which the image is to be desired and then to transmit in the interval between the periods of transmission of successive elemental strips of the subject this time condensed sound record, and then at the points of reception to expand the received sound signals to produce audible signals reproducible simultaneously with the production of the next succeeding series of light values corresponding to the next succeeding elemental strip of the subject of which the image is being produced.

Further objects and advantages of the invention are to provide a system for transmitting a combined television and sound record which is considerably simplified from the systems at present in use and in which no interference between transmitted sound and picture signals can arise; to provide a system which is simple in its construction and arrangement of parts while still efficient in operation; a system which can be compactly arranged in a receiving instrumentality so as to adapt the system to commercial use; and a system for receiving television and sound signals which can be distributed at a minimum of expense.

Still other and further objects of the invention will be pointed out in connection with the description of a preferred embodiment of this invention and others will naturally suggest themselves to those skilled in the art to which the invention is directed by reading the following specification and claims in connection with the accompanying drawings wherein:

Fig. 3 represents graphically received signals where

Figure 6:
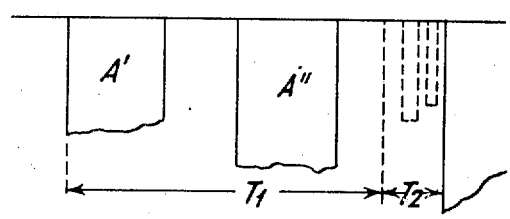
Figure 7:
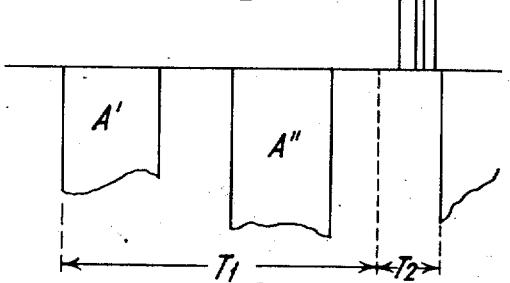
Figure 5:
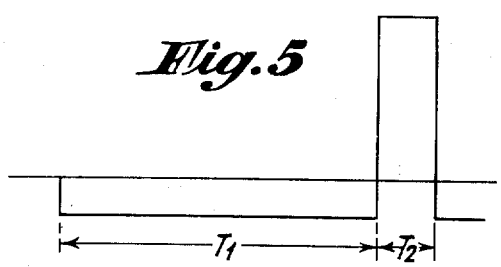
Figure 4:
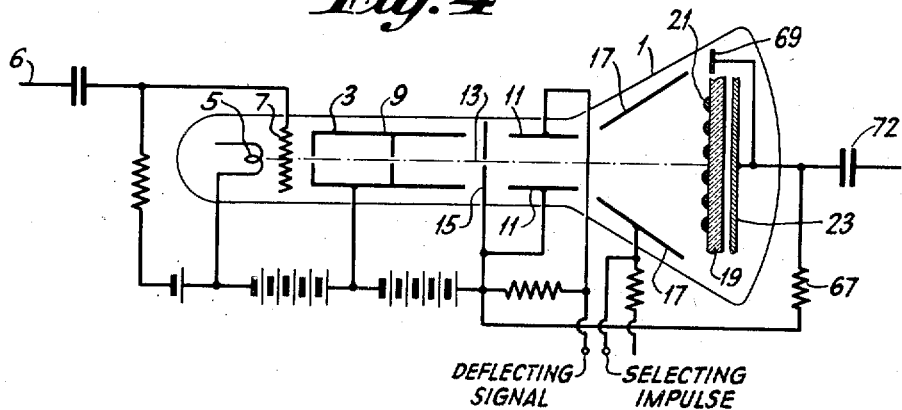
Fig. 4 is a diagrammatic showing of a sound transmitting tube.
Figure 8:
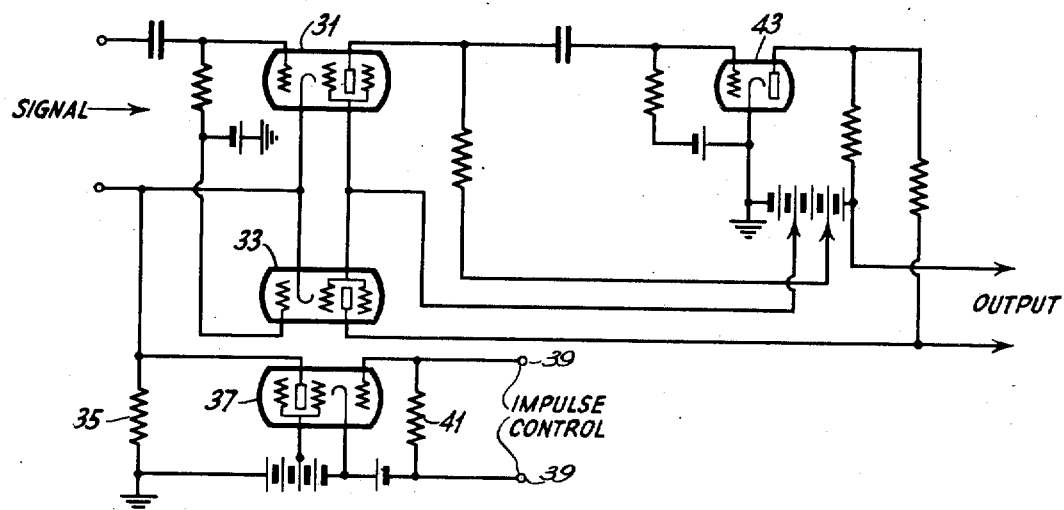
Figure 9:
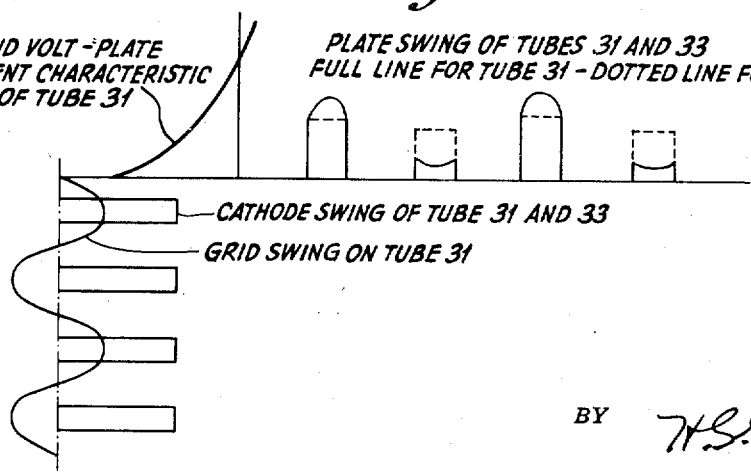
Figure 10:
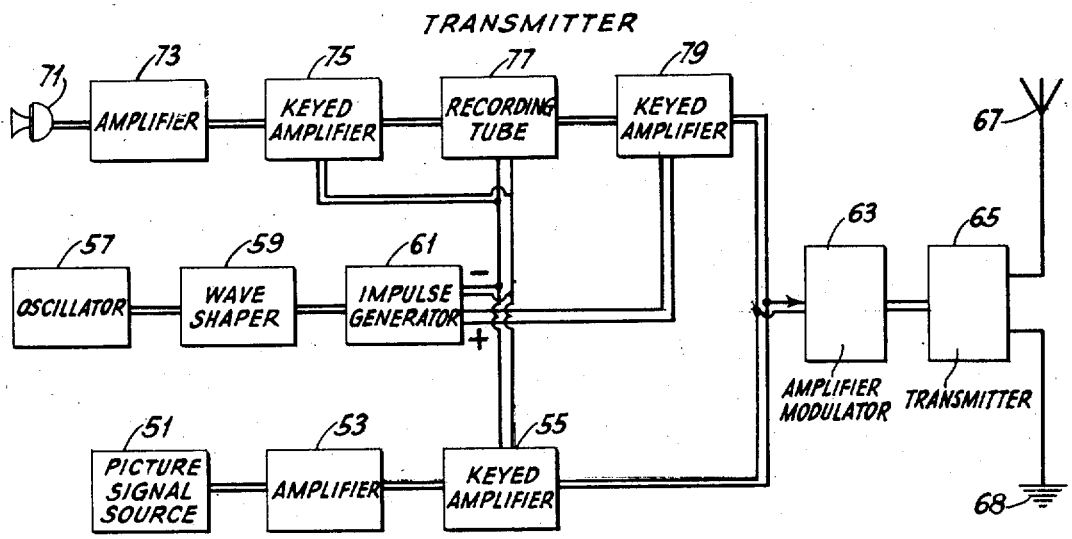
Figure 13:
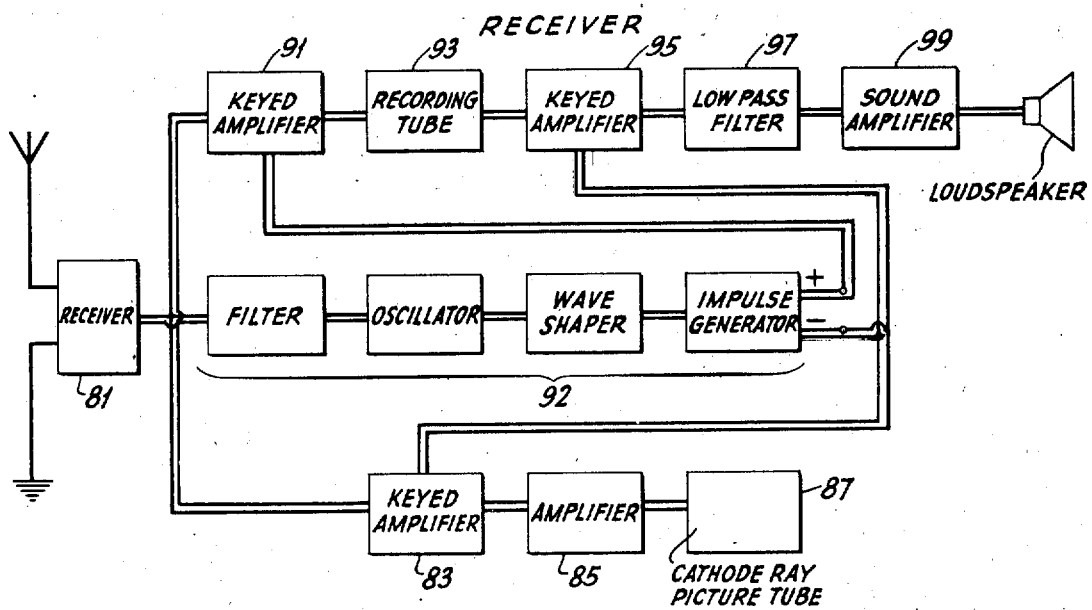

Figs. 5, 6 and 7 are curves illustrating the operation of the tube shown by Fig. 4. Of these curves, Fig. 5 shows the average potential variation on the tube control electrode with respect to the globular surface within the tube; Fig. 6 represents the potential of the globular surface with respect to time; and Fig. 7 shows the signal current plotted against time;

Fig. 8 is a schematic showing of a tube control circuit;

Fig. 9 shows curves to illustrate the operation of the tubes of Fig. 8;

Fig. 10 is a block diagram of a transmitter system;

Fig. 11 represents a complete image, with the synchronising and sound signals shown accompanying the pictorial signals;

Fig. 12 represents the globular plate within the tube shown by Fig. 4;

Fig. 13 represents in block diagram form the receiver system;

Fig. 14 represents the output signals from the receiver 81 shown by Fig. 13;

Fig. 15 represents a schematic showing of the wave shaping circuit and impulse generator; and Fig. 16 shows curves illustrative of the various operating potentials fed to and developed by the wave shaping circuit and the impulse generator.

Figure 1:
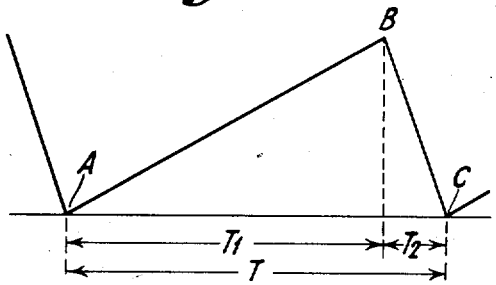
Fig. 1 represents the position of the picture scanning point or spot plotted against the time.

To refer now to the accompanying drawings for a complete understanding of one suitable form of the invention, it being understood that various modifications may be made which do not depart from the general scope of this subject matter, if reference is made first to Fig. 1 it will be seen that this figure illustrates the basic principles underlying the method of scanning. By this figure the time divisions of the unit time period making up a complete scanning cycle are shown. The unit time period is considered to be represented by the time required to scan the several elemental areas of one elemental strip or line of the subject. By this figure, the picture scanning cycle may be considered as including a time period T. The saw-tooth pattern of the curve represents the change in position of the scanning point from one maximum position to another and the return to the first position. So arranged, it can be seen that the time interval between points A and B can be represented by the time period $T_1$ which represents the picture scanning portion of the cycle. The time interval between points B and C, designated as $T_2$, is the time required for the scanning beam to return to its initial position, or back to a position corresponding to that at point A but advanced one scanning cycle. It is during this time period $T_2$ that the sound and synchronizing signals are to be transmitted. In practice it has been found suitable to arrange the ratio of the time periods $T_1$ and $T_2$ so that they vary between limiting values of the order of 6 to 1 and 10 to 1, although neither assumed value is in anyway limiting. As an average value the ratio of 9 to 1 may be assumed for purposes of illustration so that $T_2$ can be assumed as equal to T/10.

According to the arrangement which is to be disclosed herein and as has already been set forth by the Zworykin disclosure hereinabove named, it is proposed during the period $T_1$ to transmit the picture signals and during the time period $T_2$ to transmit the sound signals which occurred during the period $T_1$ and also to accompany the transmitted sound signals by all necessary signals for synchronizing the picture reproduction. It is possible to carry out this plan since a Fourier analysis shows that small frequency distortion, and substantially only small frequency distortion, is obtained when proper precautions regarding the allocation of the sound transmission time are taken.

Figure 2A:
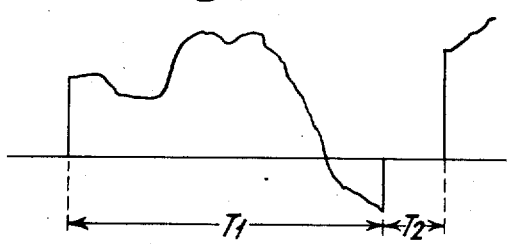
Fig. 2 represents graphically the signals transmitted and herein Fig. 2a designates an assumed wave form for the picture signal.
Fig. 2b designates an assumed wave form for an accompanying sound signal.
Fig. 2c represents a combined picture, sound and synchronising signal.
Figure 2B:
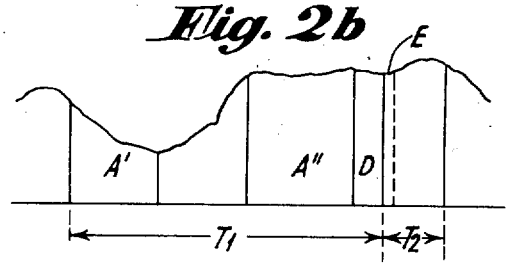
Figure 2C:
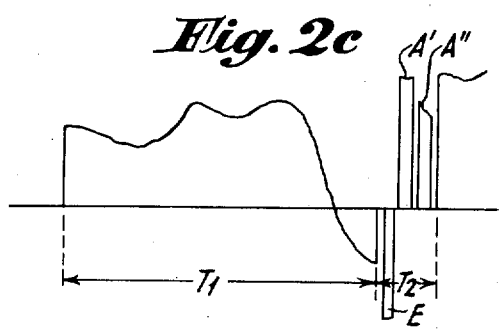

By Fig. 2 of the present disclosure the various conditions and the results obtained by the transmission of sound and picture signals have been graphically illustrated. As is seen from a consideration of portion $a$ of this figure, the picture signal is transmitted during the period $T_1$. By means of appropriate devices, to be later described herein, sound signals occurring during time periods A' and A" (see Fig. 2b) are transmitted during the time period $T_2$, as indicated by Fig. 2c. A blank period D is provided during the period $T_1$ or at the start of period $T_2$ to permit the transmission of the synchronizing impulse, which is shown as occurring during the period E of the time period $T_2$. As can be seen from the diagrammatic illustrations of Fig. 2 and particularly from curves designated as 2a and 2c, the picture signals occurring during the time period $T_1$ are transmitted unchanged, while there has been selected from the sound signals occurring during the time period $T_1$ certain groups of these sound signals, and that these sound signals in condensed form have been caused to control the transmitter during the time period $T_2$ (see Fig. 2c).

As has been made evident from the statement of invention preceding this description, the frequency channel necessary for the transmission of the picture signal as disclosed herein will be sufficiently wide to transmit also the sound impulses designated as A and A' without serious distortion. Such a combined signal will contain all of the necessary information regarding the picture itself, sound accompaniment and all necessary synchronizing impulses. This signal is then used to modulate the transmitter which can be any known and existing type of radio transmitter or a wire line communication channel or a wired radio system in any known and desired manner, as is evident from the showing in the block diagram of Fig. 10 illustrating one form of transmitter arrangement.

Figure 3A:
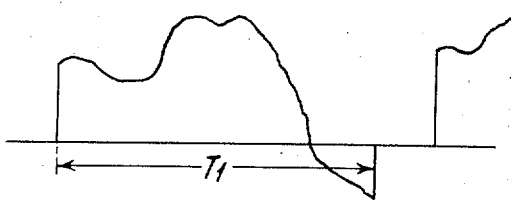
Fig. 3a is a diagrammatic representation of received picture signals and Fig. 3b is a diagrammatic representation of the selected sound signals at the transmitter and the resulting controlled electron beam intensity and the expanded received sound signals.
Figure 3B:
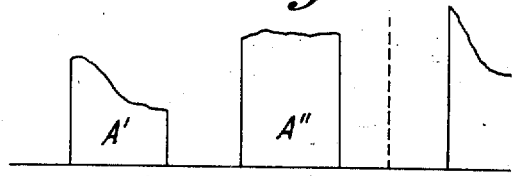

It is obvious that if the receiving equipment is to perform the reverse of these operations upon the transmitted signal and the output from the receiver system will then be of the general form shown by Fig. 3 wherein portion $3a$ designates a diagrammatic representation of received picture signals which correspond to the signals shown by Fig. 2a and Fig. 3b illustrates the sound signals also illustrated in connection with Fig. 2b. These sound signals contain sufficient information for the reconstruction of a replica of the original sound. The particular manner in which this result is accomplished, according to the present invention, will be described more fully in connection with the description of the system which follows, and especially in connection with the general arrangements shown and described in connection with Figs. 4 and 12 and their associated and related circuits.

If reference is now made to the arrangement of Fig. 4 by which the sound signals are transmitted, it can be appreciated that in order to accomplish the aims and objects of this invention it is necessary to provide some device which permits the recording of sound by some means for a finite time interval and then permits the transmission of the recorded sound at a rate more rapid than that at which it was recorded. The sound recording, according to the invention disclosed herein, is in the nature of an electrical non-pictorial sound record. To provide a control system by which this non-pictorial electrical sound record is produced certain special transmission networks are necessary. Such transmission networks, as will herein appear, have the property of allowing free transmission during certain predetermined time intervals and of providing for zero transmission at all other times.

If reference is now made especially to Fig. 4, one form of arrangement is disclosed by which it is possible to record and then transmit the sound signals occurring within the time period $T_1$. Such a device, according to the present invention, consists essentially of an electronic device such as a cathode ray tube 1, provided with the usual electron gun construction 3 and includes a source of cathode rays 5, a control grid 7 and an anode or accelerating electrode 9. In addition, there is provided within the tube envelope 1 a pair of deflecting plate electrodes, designated as 11, which serve to deflect the cathode ray pencil 13 so that it moves within the tube envelope under the control of a suitable deflecting field applied to the deflecting electrodes from an external source (not shown) which is either the same source used to control the picture scanning cathode ray tube, or a source synchronized with the operation of the picture scanning device.

In a preferred form of the arrangement herein disclosed the cathode member 5, constituting the electron emitter, is usually in the form of an indirectly heated cathode. Varying potentials are applied under the control of the sound signals to the grid electrode, herein considered as the control electrode to control the intensity of the electron beam or pencil 13 emitted from the cathode emitter 5 in proportion to the sound to be reproduced. In order to focus suitably the electron pencil or cathode ray, suitable focusing electrodes 9 and 15 are provided. The electrodes 9 constituting the anode is provided with suitable apertures through which the electron pencil may pass and the focusing electrode 15 is likewise provided with a suitable aperture of reasonably small cross-sectional area.

The conical inner portion of the tube wall is in the form of a control electrode, or, where desired, there may be provided a separate electrode 17 preferably of conical shape, although this particular shaping is not essential to carry out the invention. Adjacent the end portion of the tube there is suitably supported an insulating plate 19, preferably formed from mica or some other suitable material having similar insulating properties, upon which is suitably deposited isolated silver globules 21 (see more particularly Fig. 12) which are sensitized with caesium for a purpose to be hereinafter disclosed. Immediately behind the insulating plate member 19 there is positioned what is herein termed a signal plate member 23. To all of the electrodes suitable connections to supply operating and controlling voltages are made.

To describe now the operation of the arrangement hereinabove discussed, the purpose of the electrode members 5, 7, 9 and 11 are self-evident from what has hereinabove been stated. It may be assumed, for the purpose of consideration, that the control grid 7 is caused to have potential variations corresponding to the sound signals occurring within the time periods A' and A'' applied thereto. Then, in accordance with known theory and principles, the cathode ray pencil or electron beam 13 will have a corresponding or proportionate variation in intensity. The deflecting plates 11, being connected to an appropriate type of saw-tooth wave generator to produce deflection of the cathode ray pencil as above described, will then cause the cathode ray pencil 13 to scan the mica plate 19 upon which, as above stated, the isolated sensitized silver globules are deposited.

It has been established that the properties of the caesium sensitized silver globules coating the plate member 19 depend upon the electrical field existing between the control electrode 17 and the sensitized silver globules 21. That is, when the control electrode 17 is positive with respect to the sensitized silver globules, the sensitized globules will emit secondary electrons when bombarded by the cathode ray pencil or electron beam 13, and when the control electrode member 17 is negative with respect to the sensitized globules 21 the globules will cease to emit secondary electrons but will give up sufficient negative charge so as to again reach the proper condition for secondary electronic emission, it being understood that the storing of negative electricity upon the globules 21 corresponds to a decrease in the negative potential of the control member or electrode 17 with respect to the globules.

This phenomenon is utilized in the following manner. By means of an appropriate transmission system the signals impressed upon the control grid member 7 of the cathode ray tube are caused to be of the general form shown by Fig. 3b. This control then corresponds to an intensity variation of the cathode ray pencil or electron beam 13 which is an exact duplicate of the existing sound.

The potential of the controlling electrode 17 with respect to an arbitrary level which is the average potential of the globules 21 over a long period of time is shown by Fig. 5. The variation in potential of the globules caused by the incidence of the electron pencil or cathode ray 13 impinging thereupon is shown graphically by the diagram designated as Fig. 6.

Therefore, the current flowing through the condenser formed from the globules 21 and the signal plate 23 separated by the mica support or sheet 19 serving as a dielectric will have the form indicated graphically by the curves of Fig. 7. The wave forms of $$\overline{A''} \text{ and } \overline{A'}$$

are similar to those of A' and A'' except that they are compressed in the ratio $$\frac{T_1}{T_2}$$

From the above description it will be quite apparent that the same type of tube shown by Fig. 4 may be employed at the receiving end of the system, but in that case there is used for recording purposes the time period $T_2$ and the transmitting effect takes place during the following time period $T_1$. Obviously, such a system introduces a delay in the time of reproduction of the sound equal to the time period between successive scanning lines or, in other words, there is always a delay equal to the time required to scan one line or one elemental strip of the subject of which the electro-optical image representation is desired. According to the present system herein disclosed this time period is of the order of 150 micro seconds which is clearly permissible since it is well known that a time delay of the order of at least 100,000 micro seconds is tolerable.

In order to transmit the signals according to the above analysis the transmission networks which have the properties above mentioned as being desirable will now be described. Such a network consists primarily of a vacuum tube amplifier so arranged that certain tubes within the amplifier may be biased beyond a point of cut-off without setting up any extraneous transient disturbance of the associated network. An arrangement of this general type has been shown by Fig. 8, and may be termed a "Keyed amplifier." This amplifier has been disclosed and described in detail in my co-pending application Serial No. 644,417, filed November 26, 1932, and entitled "Amplifiers" and in British Patent No. 415,619 issued August 30, 1934, which patent was based on my co-pending application. According to this general arrangement the tubes 31 and 33 are biased beyond cut-off except at those time intervals when a negative voltage across the resistor element 35 is produced by an appropriate operating signal supplied across the input circuit of the tube 37 and across the resistor 41. During these periods the tubes 31 and 33 operate at their normal operating point. In order to prevent undue voltage surges being impressed upon any of the apparatus following, the signals from tubes 31 and 33 are combined in the plate circuit of the tube 43 which is operating, according to the showing herein, at all times as a linear amplifier. In this way the extraneous voltage variations due to a change of the bias points of the tubes 31 and 33 are balanced out and the desired signal is transmitted in the predetermined time intervals.

In order to produce the impulses for actuating the keyed amplifier described in connection with Fig. 8, reference should be made to Fig. 15 which shows one form in which the impulses may be developed for actuating the keyed amplifier. The circuit is divided for the purpose of disconnecting the operation thereof into two parts, the first, the wave shaping circuit, and the second, the impulse generator itself. The wave shaping circuit is of the form of the same type of circuit described in considerable detail in an application numbered 544,959 by Arthur W. Vance, entitled "Intelligence transmission systems," which application was filed June 17, 1931, and upon which application a British Patent 395,499 has been issued on July 30, 1933.

Referring now to Fig. 15, a saw-tooth wave as shown in Fig. 16a is applied to the input of the wave shaping circuit across the resistor 205. This wave is amplified by the triode 201 and across the plate circuit of this tube there appears a voltage wave shown in Fig. 16b. The inductance 207 may be of the order of 100 henrys or more, so that its acts substantially as an open circuit for the high frequency alternating current components but permits the D. C. plate current to be maintained constant. Connected in parallel with the inductance 207 is serially connected resistor 209 and condenser 211. The grid of the tube 203 is connected to the serially connected resistor and by suitable adjustment of the movable tap on the resistor 209, the wave shown in Fig. 16b can be impressed across the grid circuit of the tube 203. This voltage wave is linearly amplified by tube 203 and the constants of the choke 213 and the condenser 215 are so chosen as to present a voltage wave across the terminal 217 which is substantially proportional to the voltage wave shown in Fig. 16b. The operation of the impulse generator which is a type of amplifier, is disclosed in the Shore Patent No. 2,005,111, which issued on June 18, 1935, and entitled "Amplifiers." The voltage wave having the shape shown in Fig. 16b is fed to the tube 221. The tube is normally biased to cut-off by battery 223 so that there appears across the plate resistance 225 no voltage drop. The tube 231 has its grid connected to the plate resistor 225 and is biased by the battery 233 to an appropriate value so that current normally flows through the plate resistor 235 under the conditions of tube 221 being biased to cut-off. A condenser 240 is connected from the plate resistor 235 to the grid of the tube 221 in accordance with the teachings of the Shore patent referred to above. When the voltage wave of the form shown in Fig. 16b is applied, current begins to flow in the plate circuit of the tube 221, producing a voltage drop which is then amplified by tube 231, and a portion of the energy fed back as positive regeneration to the input circuit of the tube 221, under which conditions tube 231 has so much negative voltage applied between its grid and cathode by virtue of the voltage drop through the resistor 225 taking place, due to current flowing through tube 221 that the tube is cut off so that no plate current flows through resistor 235. At the same time there is no plate current flowing through the resistor 235 and consequently, there is no voltage drop across this resistor. When the linearly increasing portion of the wave shown in Fig. 16b ceases and the abrupt collapse takes place, the operation of the tubes 221 and 231 are reversed since the tube 221 goes back to its cut-off condition and the tube 231 begins to draw current. Under these conditions, there is no voltage drop across the resistor 225 while a very large negative voltage drop appears across the resistor 235.

Figs. 16c and 16d show the potential drops occurring across the resistors 225 and 235 respectively. The potential drops may then be utilized by picking off the voltage from the terminals 241 and 243 which are known respectively as the "positive impulse" and "negative impulse" terminals. It will thus be apparent that the voltages appearing across the terminals 241 or 243 may be applied to the terminals 39 of the keyed amplifier shown in Fig. 8, where the bias battery of the tube 37 is appropriately chosen so that a voltage wave of the type shown in Fig. 16c and 16d will actuate the amplifier only during the intervals when the voltage is zero.

It will be noted that the positive impulse shown in Fig. 16c will only actuate the amplifier during the very short interval, while if a voltage wave shown in Fig. 16d is supplied, then the amplifier is actuated over a relatively large interval.

With regard to the wave shaping circuit, it should be noted that, if desired, connections may be made to the terminals 217 for impressing voltage on magnetic deflecting coils. The voltage wave (16b) when impressed on such coils, will produce a current wave through the coils which will have a saw tooth wave identical with that shown in Fig. 16a and so may be used for producing linear magnetic deflection.

From the above it is apparent that the various devices necessary to accomplish the aims and objects of this invention have been individually described, but in order to obtain a full and complete understanding of the system the entire system will now be described, insofar as the cooperation of the several independent parts especially is concerned, in some detail. A general form of the layout and arrangement of a complete operating system for transmitting visual, sound and synchronizing signals has been shown by Fig. 10 wherein by a block diagram there is illustrated substantially all of the component parts of the system existing at the transmitting end.

For the purpose of consideration of the present invention it is not material as to the exact type of source provided for producing the picture signals, since such signals may be generated either by way of a disk or other saw-toothed electro-mechanical pick-up system, or preferably, by way of a cathode ray tube device as has been disclosed in further detail by the Zworykin application, to which reference has been made above. Applicant's invention may be used, therefore, with any picture signal and scanning device which provides for periodic blank periods during which no picture signal is sent, for example a system such as shown in U. S. Patent No. 2,100,279, issued November 23, 1937, to George and Heim. Such a source of picture signal has been shown in the block diagram as source 51. The output energy from the scanning device is applied to an amplifier which is so arranged to transmit signalling impulses over a very wide band of frequency with substantially no frequency or phase distortion. The output of the amplifier 53 feeds to a keyed amplifier 55 which is of the type described above in connection with Fig. 8, and to which negative impulses from the impulse generator 61 is fed. As explained above, the picture signals, therefore, will appear at the output of the keyed amplifier 55 over a relatively long interval during each cycle of the scanning process, and by blocking off during a short interval when the negative impulse occurs as shown in Fig. 16d.

In practice, the amplifier 55 will transmit signals for approximately 90% of the time period, the remaining 10% of the time during which the picture signals will not be transmitted through the keyed amplifier, being reserved for the return period of the horizontal scanning motion, that is, during the period T₂. The output of the keyed amplifier is then fed through an amplifier modulator 63 and the transmitter 65, and radiated from the antenna 67. The sound energy is picked up by the microphone 71, amplified by the conventional thermionic amplifier 73, and fed to a keyed amplifier 75 which is of the same type as 55, as described in detail in connection with Fig. 8. The amplifier 75 is also fed with negative impulses so that for substantially 90% of the time energy flows from the output of the keyed amplifier to the recording tube 77, which has been described in detail in connection with Fig. 4, which is also fed with negative impulses from the impulse generator 61. The output of the recording tube is fed to a second keyed amplifier 79 which is supplied with positive impulses from the impulse generator 61, so that the output of the recording tube flows for only substantially 10% of a horizontal scanning period. The output of the keyed amplifier feeds to the amplifier modulator 63 and transmitter 65 for radiation from the antenna 67.

By referring to Fig. 11, it will be seen that the synchronizing impulses S represent a negative variation but the picture signal P is a positive variation in the energy output. Furthermore, it will be noted that during the horizontal scanning return line, the output from the picture amplifying system is at zero level. It is an interrupted sound signal appearing in the output circuit of the amplifier 75 that is introduced upon the control grid 7 of the recording tube 1, illustrated in Fig. 4, and shown in the block diagram as recording tube 77. The electronic switch and amplifier, as noted above, is shown in Fig. 8. The deflecting plates 11 of the recording tube 1 are connected to the impulse generator 61 in Fig. 10 which operates synchronously from the horizontal synchronizing signal generator to control the image scanner, which oscillator is shown conventionally at 57 in Fig. 10. The selector or control electrode member 17 in Fig. 4 is connected to a signal source 6 of the wave form, as shown and graphically illustrated in Fig. 5 and is such that the potential existing between the control member 17 and the sensitized globules 21 is negative during the scanning period T₁ and positive during the return line period T₂.

The operation of the sound scanning tube 1 is then the same as was hereinabove described and the output signal which results when the cathode ray pencil 13 traverses the globular members 21 in the reverse direction from that of traversal during the period of storing the sound signals can be determined by the voltage generated across the output resistor 67 connected between the sound signal plate 23 and the electron source.

Within this tube 1, as shown by Fig. 4, there is generated also a horizontal synchronizing signal by means of an auxiliary electrode member 69 attached to the structure including the insulating dielectric member 19, the globules 21 and the signal plate 23. The synchronizing signal electrode is so arranged that the horizontal synchronizing signal resulting from the scanning or traversal of the electrode member 69 by the cathode ray pencil 13 produces a signal which is negative with respect to the sound signal during the return line period.

The output energy from the sound analyzing and scanning tube 1 appears across the resistor 67 and is applied to the amplifier 79 by way of the capacity 72. The amplifier 79 is arranged to transmit only during the return line time T₂ of the horizontal scanning period and is controlled in a manner similar to each of the amplifiers 55, 75 and 77, as well as a source of picture signals from the impulse generating system comprising the oscillator 57, the wave shaper 59, and the impulse generator 61.

From the above description it is believed that it will become apparent that by the use of the arrangement herein described signals of the general form shown by Fig. 2 and particularly Fig. 2c can control the transmitter so that there will be a sequence of transmitted signals to represent an image, accompanying or related sound, and signals to synchronize and control the reproduction of the transmitted signals.

While it has been above stated that the synchronizing and control circuits are not described in special detail since they do not per se form a part of this invention, it should be understood that each of these generators is adapted to develop appropriate wave forms to maintain in the described circuits an interlocked relationship in order that the various operating signals necessary for practicing this invention may function to control the transmitter at proper time periods. It is, of course, of extreme importance that the sound and picture signal systems be properly interloced in order that there may not be any overlapping of time periods of transmission and in order that the sound signals, the synchronizing signals and the picture signals may all occupy those portions of the total transmission time available which has been assigned to each in order that the desired spacing be maintained.

To receive the signals transmitted according to the arrangement hereinabove described, it might be stated briefly that the receiver equipment consists essentially of a radio receiver 81 or line amplifier, depending solely upon the means used for transmitting the signals. If it is considered, for example, that the signals are being transmitted by way of a radio communication network any known form of radio receiver may be adopted for receiving the signals. Therefore, in order to reach a consideration of the present invention and to ascertain its application to the receiving end of the network, it may be considered as including specifically that portion of the receiver which follows the second detector assuming a heterodyne receiver is used. The output signal from the second detector of any suitable type of receiver has been graphically indicated by the diagram of Fig. 14.

Assuming now that the received signals are of the form shown in Fig. 14, it is possible by means of known devices to separate the synchronizing signals from the sound and picture signals. Devices for accomplishing this purpose are known in the art and usually consist essentially of biased tubes located at appropriate points in the amplifier system, as disclosed, for example, in the above mentioned Zworykin disclosure. It is also possible to separate the vertical and horizontal synchronizing impulses due to their difference in shape or amplitude, for example, and this manner of separation has already been taught by A. W. Vance and R. D. Kell, for example, in copending applications Serial Nos. 544,959 and 565,953, upon which British Patents Nos. 395,499 issued July 20, 1933, and 407,409, issued March 22, 1934, respectively, have been obtained. The vertical and horizontal synchronizing signals by their different frequency components control the operation of certain synchronizing and control circuits which need no further mention here.

The picture signal receiving system consists essentially of an amplifier system 83 which transmits or is rendered operative, for example, under the control of the synchronizing signals, only during the scanning line period, or in other words, for time periods corresponding to the time period $T_1$. The output from this form of receiver is then connected directly to a picture signal amplifier 85 of the ordinary type from the output of which the amplified signals are arranged to control the image reconstructing or receiving device 87. Such a picture or image reconstructing device 87 may be the well known cathode ray tube disclosed by the above named Zworykin disclosure, or, where desired, may be a disk or any suitable type of light valve to control the image reproduction. This device operates under the control of the synchronizing signals and is, therefore, so connected with the synchronizing and control circuit system that the control signals are supplied thereto by way of control channels or circuits 89 and 90 from the source 92.

The sound receiving system, as is evident from a consideration of the transmission end of the system, consists essentially of an amplifier device 91, energized from the receiver 81. The amplifier 91 is arranged to transmit or pass current only during the return line period $T_2$ of the horizontal scanning period and is controlled from the synchronizing signal and control source 92. The sound signal output energy from the amplifier 91 is then impressed upon the sound recording and delay device 93 which is similar to the device shown by Fig. 4 and, therefore, operates in the same general manner except that the operation is just the reverse of that of the tube 1 at the transmitting end of the system, by which is meant that the charge and discharge actions are reversed in that the tube at the receiver stores the energy during the short time period $T_2$ and dissipates the stored charge during the next following long time period $T_1$. Such an electronic switching has been described above in connection with Fig. 8.

By applying appropriate voltages to the selector electrode of sound energy storing tube the cathode rays under the control of the received sound signals impinging upon the sensitized globular construction are caused to record the transmitted sound signals during the return line period $T_2$ and with the voltage on the electrode 17 then changed to transmit these recorded sound signals during the scanning period $T_1$. As was the case in the transmitter end of the system the cathode ray pencil is of varying intensity during the signal storage period but of constant intensity during the signal release or discharge period.

From what has been described above, it is apparent that in view of the fact that the ray pencil 13 traverses the sound signal storing tube at the transmitter end, for example, during the picture scanning time period $T_1$ when the sound signals are being stored, in a direction from left to right and then traverses the same globular construction during the time period desired for transmission, that is, the time period $T_2$ of interruption of image signal transmission, in a direction from right to left, the sound signals will be transmitted backwards or in reverse order from that of their actual occurrence. If now at the various receiving points the sound signals are stored during the time period $T_2$ it can be seen that these signals will be stored during the time period when the ray pencil in the sound receiving and storing tube moves rapidly, for example, from right to left during the time period corresponding to time period $T_2$. In view of the fact that there is, as above stated, a delay in the time of reproduction of these sound signals of a time period T corresponding to one picture line or elemental strip scanning cycle, the sound signals last to be stored will be the first to be reproduced or, in other words, there is still another reversal so that the order of reproduction of the stored sound signals at the receiver is in proper time sequence.

The output energy from the sound signal storing device as appears across a resistor similar to resistor 67 is then impressed upon an amplifier system which is rendered operative only during the horizontal scanning period $T_1$. The output from amplifier 95 is then passed through a low pass filter 97 of known type so as to exclude the undesired higher frequencies present in the output signals from the amplifier system. The result is that the desired signals, corresponding to the sound originating at the point of transmission and controlling the grid electrode 7 of the sound transmitting tube 1, are then supplied to a suitable sound reproducer of any type known in the art so that sound signals representing the sound effects occurring at the point of transmission are reproduced simultaneously with the production of electro-optical effects representative of the subject being scanned optically at the point of transmission.

Thus, from the above description it is apparent that there occurs during certain time periods of operation a storage effect within the tube 1, whether the tube be located at the point of transmission or at the point of reception, and that at other time periods, due to the control in the voltage applied to the controlling electrode member 17 of this tube, secondary electronic emission occurs within the tube so that the tube operating under the control of the cathode ray pencil (then uncontrolled as to its intensity) discharges the stored charges representative of the sound. These charges are then utilized after any desired amplification to control and modulate the transmitter or to control the sound reproducer of the receiver.

The manner in which the synchronizing signals are utilized to modulate the transmitter has already been disclosed in the above mentioned applications of Messrs. Vance and Kell and needs no further description herein.

Having described my invention, what I claim is:

1. The method of transmitting sound intelligence signal representations accompanying electro-optical effects which comprises successively producing in accordance with the intelligence signals to be transmitted a plurality of electrical charges representative of predetermined portions of the entire sound intelligence signal, producing varying degrees of secondary electronic emission within an electron tube under the control of the produced charges at time period subsequent to the production of charges, and transmitting during a time period of short duration electrical signals representative of compressed predetermined portions of the intelligence signal controlled in accordance with the variances in secondary electronic emission.

2. In a system for transmitting combined sight and sound intelligence signals wherein the sight signals are first transmitted and the transmission is then interrupted and wherein the periods of transmission and interruption bear a time relationship to each other of the order of nine to one, means for transmitting during the longer time period electro-optical image signals, means for successively storing during the period of transmission of electro-optical image signals sound intelligence signals in the form of electrostatic charges, means for controlling during the period of interruption of electro-optical signal transmission the secondary electronic emission within an electron tube in accordance with the electrostatic charges produced, means for sequentially transmitting signals controlled in accordance with the electro-optical effects and in accordance with the secondary electronic emission effects, and means for causing repetitions of the sequence of transmission at a rate equal to the line scanning rate necessary to produce complete images at repetition rates at least equal to the frequency of persistence of vision.

3. In a system for transmitting combined image and sound intelligence signals wherein the electro-optical image signals are alternately transmitted and interrupted and wherein sound intelligence signals are alternately transmitted and interrupted in opposite time relationship and wherein the time periods bear a relationship one to the other of the order of nine to one, means for transmitting during the longer time period electro-optical image signals, means for successively storing during the period of transmission of electro-optical image signals sound intelligence signals in the form of electrostatic charges, means for controlling the secondary electronic emission within an electron tube in accordance with the electrostatic charges produced during the period of interruption of electro-optical signal transmission, means for continually transmitting signals controlled in sequence by the electro-optical effects and by variances in the secondary electronic emission effects, and means for causing the repetition of the sequence of transmission at a line scanning rate corresponding to the frequency necessary to cause the complete electro-optical image to be scanned at a rate at least equal to the frequency of persistence of vision.

4. In a system for transmitting signals, a cathode ray tube including means for producing therein a pencil of cathode rays, a conducting plate member in the path of the cathode rays, an insulated member provided with a covering of isolated globules having high secondary electronic emission power supported upon the plate member, means for controlling the intensity of the cathode rays generated within the tube at predetermined time intervals in accordance with the intensity of the signals to be transmitted, means for deflecting the controlled cathode rays within the tube in one direction to cause the rays to impinge successively upon different isolated globules to produce thereon electrostatic charges of values proportionate to the controlling voltage applied to control the intensity of the cathode ray pencil, means to deflect the cathode rays in a second direction as uncontrolled intensity rays, a control member within the tube positioned between the deflecting means and the isolated globules, and means for producing secondary electronic emission by the traversal of the isolated globules by the cathode ray pencil during periods of uncontrolled cathode ray intensity by controlling the potential applied to the control member relative to the potential acting upon the plate electrode member.

5. In a system for transmitting signals, a cathode ray tube including means for producing therein a pencil of cathode rays, a conducting plate member in the path of the cathode rays, an insulated member provided with a covering of isolated photo sensitized globules supported upon the plate member, means for controlling the intensity of the cathode rays generated within the tube at predetermined time intervals in accordance with the intensity of the signals to be transmitted, means for deflecting the controlled cathode rays within the tube in one direction to cause the rays to impinge successively upon different isolated photo sensitized globules to produce thereon electrostatic charges of values proportionate to the controlling voltage applied to control the intensity of the cathode ray pencil, means for interrupting the control of the cathode ray pencil intensity at other predetermined time periods, means to deflect the uncontrolled intensity cathode ray pencil in a direction opposite to the first direction of deflection, a control member within the electron tube positioned between the deflecting means and the isolated globules, and means for producing secondary electronic emission by the traversal of the isolated globules by the cathode ray pencil during periods of uncontrolled cathode ray intensity by controlling the potential applied to the control member relative to the potential acting upon the plate electrode member.

6. A system for transmitting electrical sound intelligence signals during a limited portion of the entire transmission period available which comprises an electron tube, means for successively storing electrically within the electron tube a series of electrostatic charges of values proportional to the electrical sound intelligence signals occurring within a major portion of the unit time period, means contained within the electron tube for utilizing the produced electrostatic charges to control secondary electronic emission within the tube during a minor time portion of the unit time period, and means for producing in accordance with the secondary electronic emission effects produced a transmitted signal modulated in accordance with the varying degrees of secondary electronic emission produced within the tube.

7. A system for transmitting by the aid of an electron tube a time compressed sound intelligence signal during a limited portion of the entire transmission period available which comprises an electron tube, means for successively storing electrically within the electron tube a series of electrostatic charges of values proportional to the sound intelligence signals occurring within a major portion of a unit time period, means contained within the electron tube for utilizing the produced electrostatic charges to control secondary electronic emission within the tube during a minor time portion of the unit time period, a transmitter, and means for controlling the transmitter during the minor time period in accordance with the secondary electronic emission effects, to produce a transmitted signal modulated in accordance with the varying degrees of secondary electronic emission produced within the tube and compressed in time in respect to the time required to produce the modulating signals.

8. In a system for transmitting combined image and sound intelligence signals wherein electro-optical image signals are alternately transmitted and interrupted and wherein sound intelligence signals are alternately transmitted and interrupted in opposite time relationship and wherein the periods bear a time relationship to each other of the order of nine to one, means for transmitting during each longer time period a series of electro-optical image signals representative of a single elemental strip of the subject, means for successively storing during the period of transmission of electro-optical image signals sound intelligence signals in the form of electrostatic charges, means for applying during the period of interruption of electro-optical signal transmission a biasing voltage to the intelligence signal storing element to cause secondary electronic emissions varying in accordance with the electrostatic charges produced, means for continually transmitting signals controlled in sequence by the electro-optical effects and by variances in the secondary electronic emission effects, and means for causing the repetition of the sequence of transmission of both effects at a frequency corresponding to the line scanning frequency required to produce predetermined image detail with each complete image signal recurring at a frequency at least equal to the frequency of persistence of vision.

HARRY BRANSON.